(12) United States Patent
Mahadev et al.

(10) Patent No.: US 7,513,820 B2
(45) Date of Patent: Apr. 7, 2009

(54) METHOD AND APPARATUS FOR PRODUCING MICRO-TEXTURE ON A SLIDER SUBSTRATE USING CHEMICAL AND MECHANICAL POLISHING TECHNIQUES

(75) Inventors: Niraj Mahadev, Milpitas, CA (US); Winston Jose, San Jose, CA (US); Kazumasa Yasuda, Sunnyvale, CA (US); Rudy Ayala, San Jose, CA (US); Tam Nguyen, San Jose, CA (US)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 0 days.

(21) Appl. No.: 11/378,100

(22) Filed: Mar. 16, 2006

(65) Prior Publication Data

US 2007/0218807 A1    Sep. 20, 2007

(51) Int. Cl.
*B24B 1/00* (2006.01)
(52) U.S. Cl. ............................. 451/36; 451/59; 451/272; 451/273; 216/22; 29/603.16
(58) Field of Classification Search ................... 451/36, 451/41, 59, 285, 287, 288, 272, 273; 216/22; 29/603.15, 603.16; 360/235.1, 237.1, 135
See application file for complete search history.

(56) References Cited

U.S. PATENT DOCUMENTS

| | | | |
|---|---|---|---|
| 3,673,746 A * | 7/1972 | Highberg | 451/41 |
| 5,967,880 A | 10/1999 | Major | 451/36 |
| 6,131,271 A * | 10/2000 | Fontana et al. | 29/603.14 |
| 6,428,715 B1 | 8/2002 | Abels et al. | 216/22 |
| 6,493,184 B1 * | 12/2002 | Smith | 360/135 |
| 6,692,338 B1 * | 2/2004 | Kirchner | 451/41 |
| 6,712,985 B2 | 3/2004 | Biskeborn | 216/22 |
| 2004/0142641 A1 * | 7/2004 | Ohno et al. | 451/41 |

\* cited by examiner

*Primary Examiner*—Eileen P. Morgan
(74) *Attorney, Agent, or Firm*—Kenyon & Kenyon LLP

(57) ABSTRACT

A system and method for producing micro-texture on a slider substrate using chemical & mechanical polishing techniques is described. In certain embodiments of the present invention, this is accomplished by a method comprising formulating an abrasive slurry solution of predetermined acidity (or pH value), treating a chemical mechanical polishing pad with the abrasive slurry, disposing magnetic heads on the chemical mechanical polishing pad and lapping and grinding the magnetic heads for a predetermined period of time. In certain embodiment of the present invention the lapping and grinding of the magnetic heads are accomplished using an apparatus comprising an abrasive slurry solution of predetermined acidity (pH value), a chemical mechanical polishing pad treated with the abrasive slurry solution, wherein the magnetic heads are attached to a fixture capable of disposing the heads on the chemical mechanical polishing pad.

24 Claims, 10 Drawing Sheets

The TiC grains in the picture below are not seen as distinctively as the grains in the picture above.

METHOD AND APPARATUS FOR PRODUCING MICRO-TEXTURE ON A SLIDER SUBSTRATE USING CHEMICAL AND MECHANICAL POLISHING TECHNIQUES

BACKGROUND OF THE INVENTION

A. Field of the Invention

The present invention is directed to magnetic head sliders used in hard disk drive (HDD) head gimbal assemblies. More specifically, the present invention pertains to producing micro-texture on a slider substrate using chemical & mechanical polishing techniques.

B. Description of the Related Art

Presently, the hard disk drive industry is observing great success in the consumer electronics environment. One of the main reasons for this success is the ability to achieve ever increasing storage capacity reflecting consumer demand in ever decreasing form factors (e.g., greater than 1 Gb in 1" disks and below for portable music players). So far, these advancements are being achieved with minimal cost compared to competitors (e.g., flash memory).

However, continuing these advances require overcoming arising design and manufacturing difficulties. These difficulties can be found both in the drive level and the component level.

By way of background, while executing a read/write instruction, an actuator (arm) of a disk drive operates to position a magnetic head along the surface of a rotating disk. Typically, this magnetic head is supported on a slider. A typical slider body is shown in FIG. 1. As shown in FIG. 1, an ABS 102 design known for a common slider 104 may be formed with a pair of parallel rails 106 and 108 that extend along the outer edges of the slider surface facing the disk. The two rails 106 and 108 typically run along at least a portion of the slider body length from the leading edge 110 to the trailing edge 112. The leading edge 110 is defined as the edge of the slider that the rotating disk passes before running the length of the slider 104 towards a trailing edge 112. The transducer or magnetic element 114 is typically mounted at some location along the trailing edge 112 of the slider as shown in FIG. 1.

The operation of a typical slider is shown in FIG. 2. A suspension 204 holds the head gimbal assembly (HGA) 202 over the moving disk 206 (having edge 208) and moving in the direction indicated by arrow 210. In operation of the disk drive, as shown in FIG. 2, an actuator 212 moves the HGA over various diameters of the disk 206 (e.g., inner diameter (ID), middle diameter (MD) and outer diameter (OD)) over arc 214.

In order to continue the current advances in disk drive technology, two main design criteria must be continuously addressed and improved upon: a) the flying height and b) the surface roughness of the various disk drive components, while maintaining optimum flying characteristics of the head (e.g., crown, camber, twist, and overcoat and pole tip recession).

In order to achieve maximum hard disk drive performance, the head must fly as close to the surface of the disk as possible while still maintaining a consistent, required spacing. This spacing is also known as the "flying height" or "magnetic spacing" of the disk. When a disk is rotated, it carries with it a small amount of flowing air (substantially parallel to the tangential velocity of the disk) on its surface that acts to support a magnetic head flying above, thereby creating the "flying height" of the head above the disk. Typically, the slider supporting the head is aerodynamically shaped to use the flow of this small amount of air to maintain a uniform distance from the surface of the rotating disk, thereby preventing the head from contacting the disk. The surface of magnetic head closest to the disk (and being supported by the flowing air) is referred to as the "air bearing surface". In FIG. 1, the rails 106 and 108 form the air bearing surface on which the slider flies, and provide the necessary lift upon contact with the air flow created by the spinning disk. As the disk rotates, the generated wind or air flow runs along underneath, and in between, the slider rails 106 and 108. As the air flow passes beneath the rails 106 and 108, the air pressure between the rails and the disk increases thereby providing positive pressurization and lift. In general, as the air bearing surface area increases, the amount of lift created is also increased. Therefore, as a design criterion, there is a need for a method that allows for design of a flying height constituting the minimal amount of spacing between the head and the disk required for successful operation of the hard disk drive.

Second, any surface roughness issues must be addressed to overcome any associated friction issues that might impede the head's ability to fly as close to the surface of the disk as possible. Along with general frictional resistance due to the moving parts of the disk drive (e.g., the disk, the loading/unloading zones or the magnetic head), excessive surface roughness of either the disk or the magnetic head significantly increases the chances of HDI (head disk interaction), often resulting in intermittent contact and/or crashes. However, while it is possible to smoothen these surfaces, continuously increasing the smoothness comes with problems as well. Smoother surfaces lead to increased inter-molecular (Van der Waal's) forces acting at the interface and higher sensitivity to altitude and pressure changes during operational mode. Both of these factors may cause increased undesired variations in the flying height. Therefore, there is a need for a cost-effective process that can easily attain the desired smoothness of the disk designed for optimum performance.

The flying height and the surface roughness of the disk drive components must be designed to preserve the mechanical operating parameters of the head, such as crown, camber and twist. The "crown" represents a deformation in shape along forward and aft directions of the slider (as shown by the Y-Y plane), and the "camber" represents a deformation in shape along lateral directions of the magnetic head slider (as shown by X-X plane). Crown and camber are shown in FIG. 3. Also, while achieving the desired value of micro texture on the substrate, the overcoat recession and pole tip recession characteristics of the head must be optimal as well. Overcoat recession is the difference in height between the surface of the alumina of the head and the air bearing surface. Pole tip recession is the difference in height between the pole tip material and the air-bearing surface.

Generally, grinding and lapping are processes by which the head is smoothened and finished. Specifically, grinding is a process of material removal in which a surface composed of many hard abrasive grits wears away a softer material. Lapping is a manufacturing method that employs particles of an abrasive material (often in liquid form) to remove undesired stock from a surface.

Several attempts have been made to address these issues both at the disk and head level. For instance, a certain amount of texturing may be designed in at the loading/unloading areas (i.e., "zone texturing") in order to reduce the effects described above. However, it proves to be an insufficient and inefficient method for achieving desired performance.

Another option can be to increase the roughness of the disk as shown in FIG. 4a. FIG. 4a shows a smooth slider body surface flying above a textured disk surface. However, again as discussed above, increasing roughness in such a manner may become an issue when the increased roughness leads to greater friction, thereby creating a greater-than-required flying height. Moreover, increasing the surface roughness of the disk (being the data carrier) is generally not favored. Another alternative for increasing surface roughness for optimal performance is the texturing of the slider body itself as shown in FIG. 4b. FIG. 4b shows a textured slider body surface and a smooth disk surface.

Generally, a slider body may be comprised of a two-phase granular composite ceramic material called AlTiC (Aluminum Titanium Carbide), wherein the AlTiC is formed by distinctive grains of $Al_2O_3$ (aluminum oxide) and TiC (titanium carbide). The head portion of the slider typically is a thin layer of alumina fabricated on the trailing edge face of the slider portion in which the magnetic portion of the head is embedded. FIGS. 5a-b illustrate in a top and side view of one embodiment of a slider 504. The substrate 502 may then be deposited with an undercoat material 504 of sputtered transparent alumina. The shield 506 and read/write sensor 508 may be built onto the sputtered transparent alumina using conventional photolithographic and electro deposition techniques. The read/write sensor 508 may then be carefully deposited with the overcoat material 510 (also alumina), which also serves as a dielectric medium encasing the read/write sensor 508 of the head.

However, it is often the alumina portion of the slider that if not designed correctly, comes in contact with a disk, thereby causing failure. The overextension of the overcoat of alumina is generally the result of improper lapping. Therefore, it is primary design goal to ensure that, regardless of the operating conditions of the slider, the height of any alumina along the trailing edge of a slider not be above height of the air bearing surface of the slider.

A method for texturing the slider body is suggested in "Method and Apparatus for Ultrasonically Texturing ABS of Magnetic Head of Hard Disk Drive" (U.S. Pat. No. 5,967,880). In this method, ultrasonic energy in the form of a sonitrode is used in combination with an abrasive alumina slurry to produce a micro-texture on the slider body. In particular, the head is juxtaposed with the disk, and an abrasive slurry is disposed there between. Finally, the sonitrode is vibrated to created a texturing along the air bearing surface of the head. However, this method has its limitations. First, the use of the vibrations from the sonitrode along the surface of the head creates manufacturing irregularities and any excess jarring of the slider body may diminish the performance of the head. Secondly, as the abrasive slurry particles collide with the body, the particles often fuse to the slider body. This fused abrasives are practically impossible to remove, leaving behind foreign bodies embedded in the slider. Consequently, the probability of interference in proper flying height characteristics is largely increased, the amount depending on the size and amount of the abrasive slurry fused to the head. This interference, when sufficient, can result in catastrophic failures during drive level operation.

A third, alternative approach practiced in today's industry is the use of an etching process to create the composite used to form the slider body material (e.g., the two phase composite of $Al_2O_3$ and TiC discussed above). Alumina grains may be preferentially etched over the granular composite material to create relative differences in the heights of the two grains, thereby creating a micro-texture shown in FIG. 6a-b. This micro texture produced with this technique is due to the difference in the etch rate of the two materials. However, since this method uses an ion beam applied to the surface of the slider, there is a risk of exposing the sensitive elements of the reader to the high energy of the ion beam (as shown in FIG. 7). The amount of texture created is directly proportional to the time the composite is exposed the energy beam. However, when a reader is exposed to a excessive amount of energy, it begins to show signs of magnetic degradation. One approach to negating the effects of the energy beam is to cover the sensitive reader elements with a photo resist (as shown in FIG. 8), and then subjecting it to the beam. However, this creates further complications in the fabrication process, and degrades magnetic head performance.

Another approach has been discussed in "Method for Producing Sliders" (U.S. Pat. No. 6,428,715), disclosing a method for removing alumina protrusion wherein the air bearing surface of the slider is treated with an aqueous base having a pH of approximately 9-11. However, this method is disadvantageous from a manufacturing point of view, as the etching process disclosed requires actually immersing the selected elements in the aqueous solution. The process is both imprecise and not cost-efficient.

Another method described in "Method and apparatus for the manufacture of thin film magnetic transducers using a compliant, soft lapping process" (U.S. Pat. No. 6,712,985), discloses a chemical-mechanical process entailing the use of a lapping media slurry in conjunction with a soft compliant pad. The lapping media is then applied to the surface of the head using the soft compliant pad. Upon application, the motion of the compliant pad allows the mechanical etchants to eliminate anomalies between the magneto-resistive sensor element of the head and the shields. However, this process is limited by its imprecision in the applications of the slurry, and is generally directed towards the elimination of anomalies and smears, not towards the creation of a micro texture on a slider body.

Conventional lapping processes typically use diamonds as the mechanical abrasive found in the slurry used to create the finished surface. Diamond, being very hard relative to the magneto-resistive sensor and the adjoining shields, upon contact leaves behind residual stress points which diminish the magnetic performance of the head. There is a need for a method which utilizes a much softer abrasive in order to avoid the residual stress points left behind. Moreover, lapping with a diamond slurry often causes the surface of the magnetic head to become scratched thereby diminishing the magnetic head performance. Lastly, lapping with the embedded diamond particles found in the diamond slurry often leaves behind markings (commonly referred to as "black spots") on the magneto-resistive sensor and shield areas.

Therefore, it is evident that there is a need for a developing a new method overcoming the aforementioned deficiencies and producing an optimum amount of micro-texture to be precisely fabricated on a slider substrate in a cost-efficient manner.

BRIEF DESCRIPTION OF THE DRAWINGS

FIG. 4b provides an illustration of a textured slider body surface and a smooth disk surface.

DETAILED DESCRIPTION OF THE DRAWINGS

A method and apparatus for producing micro-texture on a slider substrate using chemical & mechanical polishing techniques is disclosed. The micro-texture is created using chemical-mechanical polishing techniques. In one embodiment, the abrasivity and the alkalinity of a slurry is used to create the micro-texture on a slider body.

By way of background, during the manufacture of sliders, multiple magnetic transducers are deposited simultaneously on a wafer surface. These multiple magnetic transducers along the wafer surface are typically sliced into groups to form a row bar of sliders. These row bars of multiple sliders further comprising magnetic heads are then mounted on fixtures and further prepared (e.g., using grinding and lapping techniques) to ensure that the magnetic heads have a flat profile.

Figure 9:
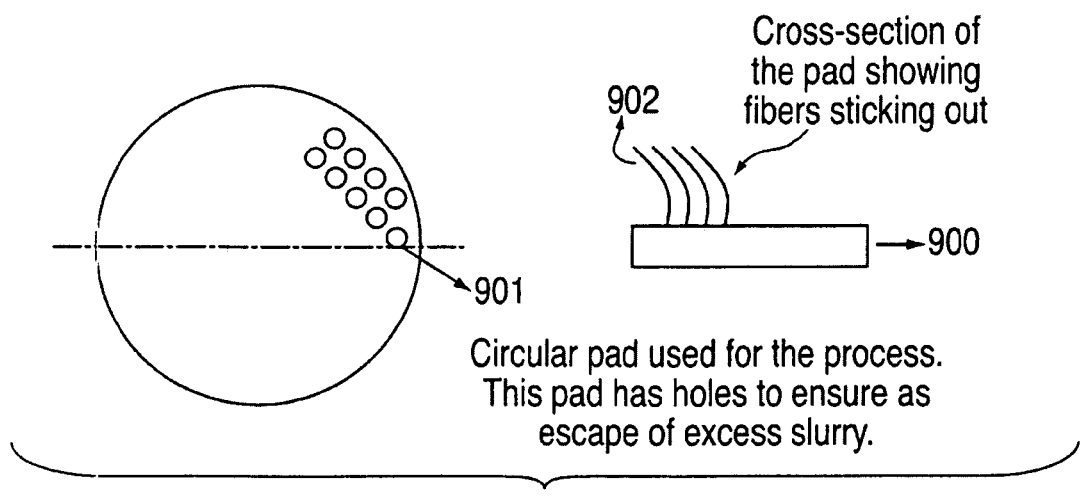
FIG. 9 provides an illustration of an embodiment of a chemical mechanical polishing (CMP) pad 600.

In embodiments of the present invention, a CMP (chemical-mechanical polishing) pad is used to help to attain the required abrasiveness of the surface of the head. FIG. 9 shows an embodiment of a CMP pad 900. Fibers 902 of a predetermined length stick out from the base. In a preferred embodiment, the fibers may be approximately 600 microns in length. As the CMP pad 900 is rubbed against the surface of row bars, these fibers capture abrasive alumina particles dispersed over the head. In this embodiment, the pad 900 has holes 901 disposed over its surface. Holes 901 operate to prevent any slurry build up during the lapping process by allowing the excess slurry to seep out. The pad may also be wiped (e.g., with a cloth, discussed below) to ensure uniform distribution of the slurry across the radii of the pad, thereby guaranteeing uniform removal rates.

Therefore, in embodiments of the present invention, using a rotating CMP pad treated with an abrasive slurry causes the row bars to come in contact with the CMP pad surface slurry, thereby lapping away excessive alumina overcoat recession of the magnetic heads (utilizing the chemical and mechanical reasons described above).

Another key element in the lapping process is the choice of an abrasive slurry. In embodiments of the present invention, the CMP pad is treated with a slurry solution having a known, appropriate value of pH (acidity). In a preferred embodiment, the slurry is comprised of dense colloidal silica particulates of approximately 30 nm in mean diameter. The abrasive slurry (i.e., "chemical etchant") in this embodiment, comprising the relatively softer colloidal silica particles, are dispersed in de-ionized water by a 5% weight ratio, resulting in a solution with pH value of approximately 8. The slurry is formulated to achieve maximum homogeneity, thereby achieving uniform and minimal removal of the head material during lapping.

Figure 10:
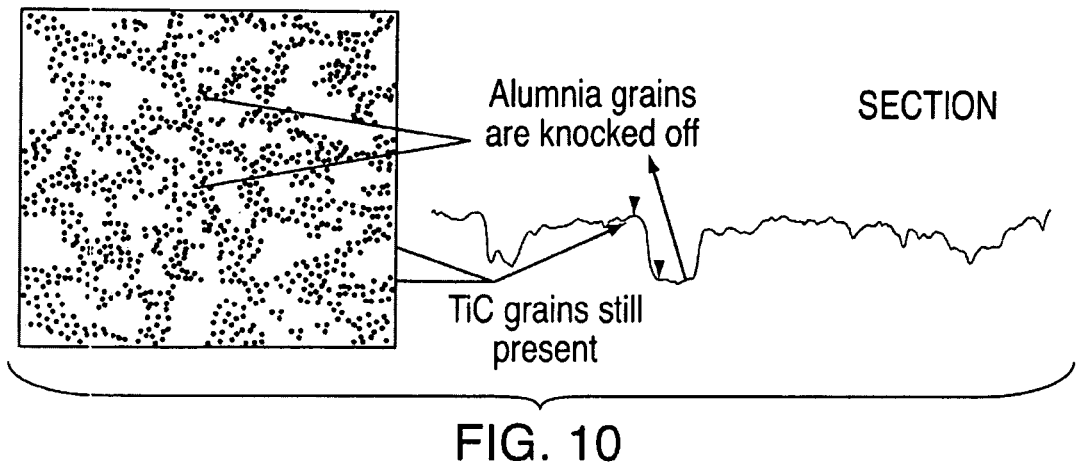
FIG. 10 provides an illustration of the dislodged loose alumina grains off of the slider body while also showing the remaining TiC grains.

The relatively lower pH of this slurry solution serves to eliminate the threat of corrosion on the shield metals and the other ferrous metals in the magneto-resistive head. The alkaline solution operates to weaken the alumina grain boundary on contact, and when combined with the additional abrasive action of the CMP pad, the loose alumina grains are dislodged from the slider body. With the alumina grains knocked off from the neighboring titanium carbide grains, a micro-texture resulting from the relative height differences between the two kinds of grains is created, while still maintaining a lower overcoat recession. A micro-texture according to an embodiment of the present invention is illustrated in FIG. 10. FIG. 10 illustrates that while some alumina grains are knocked off, the TiC grains are still present creating the desired micro-texture.

Moreover, use of colloidal silica slurry serves to avoid the "stress point", "black spots" and scratching problems discussed above. Colloidal silica has a Knoop hardness much lower than a diamond, thereby alleviating the residual stress issues that cause diminishment in the magnetic head performance.

Using a colloidal silica slurry also helps to remove smear or metal shorts along the sensor region, thereby enhancing magnetic performance. During the fabrication process, the magnetic heads are subject to various forces which tend to leave behind unwanted stress points and electrical shorts in the reader surface. However, the abrasive alkaline colloidal silica particles in the slurry configuration lap away small amounts of reader material surface, leaving behind a new less stressed sensor layer relatively free of residual shorts and stresses.

Figure 1:
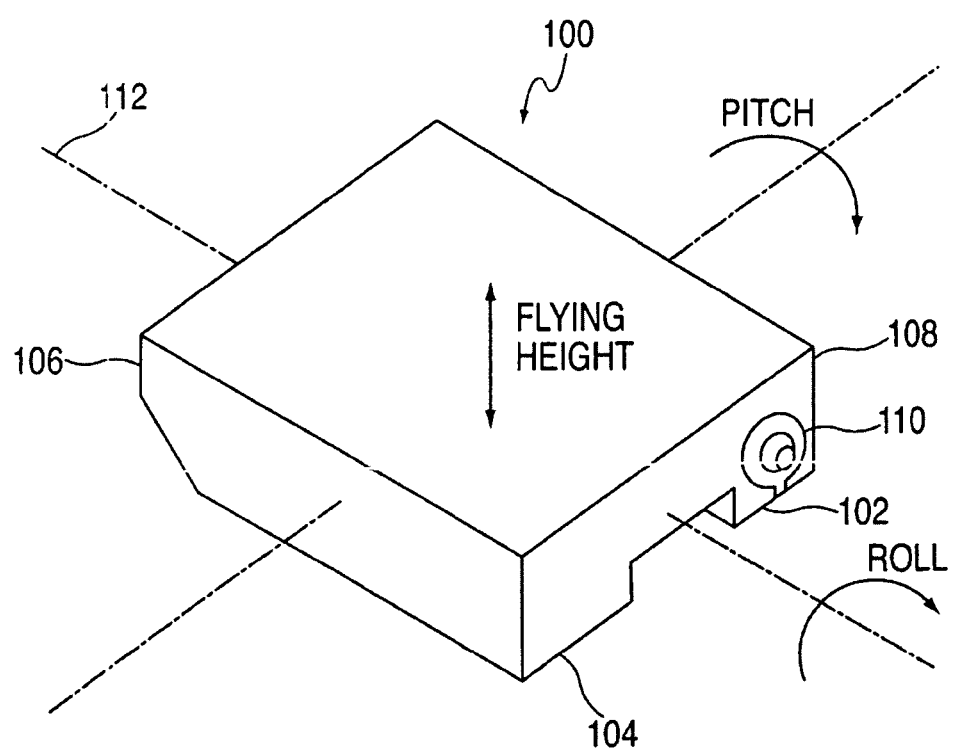
FIG. 1 provides an illustration of a typical slider.
Figure 2:
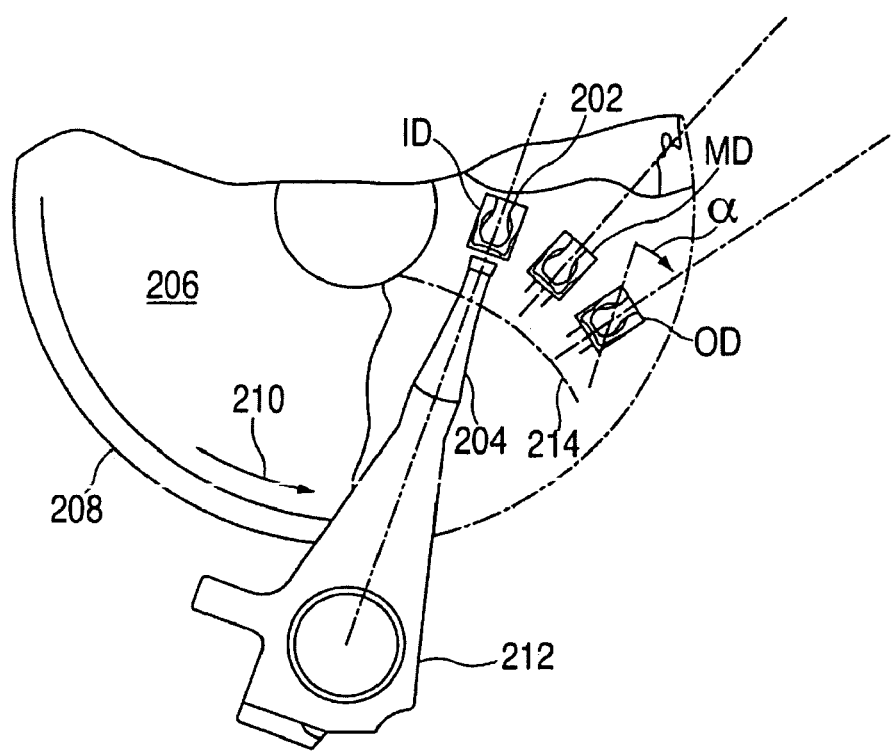
FIG. 2 provides an illustration of the typical operation of a typical slider.
Figure 3:
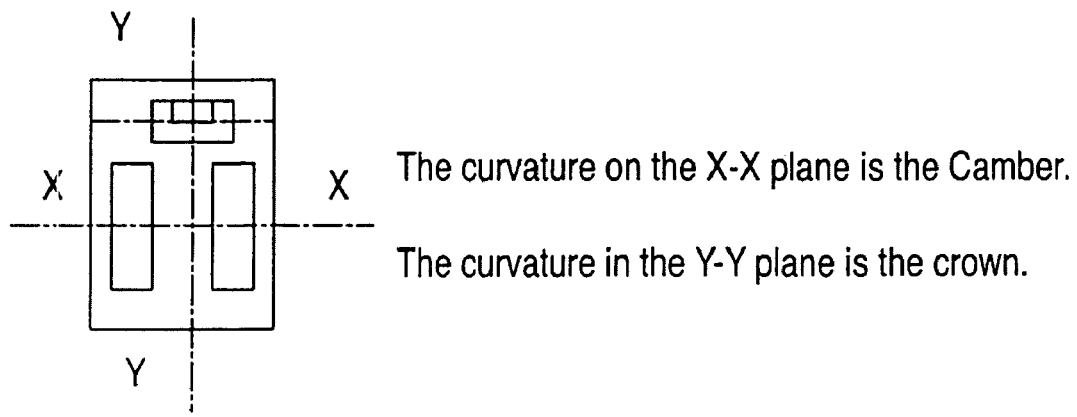
FIG. 3 provides an illustration of crown and camber on a slider body.
Figure 11:
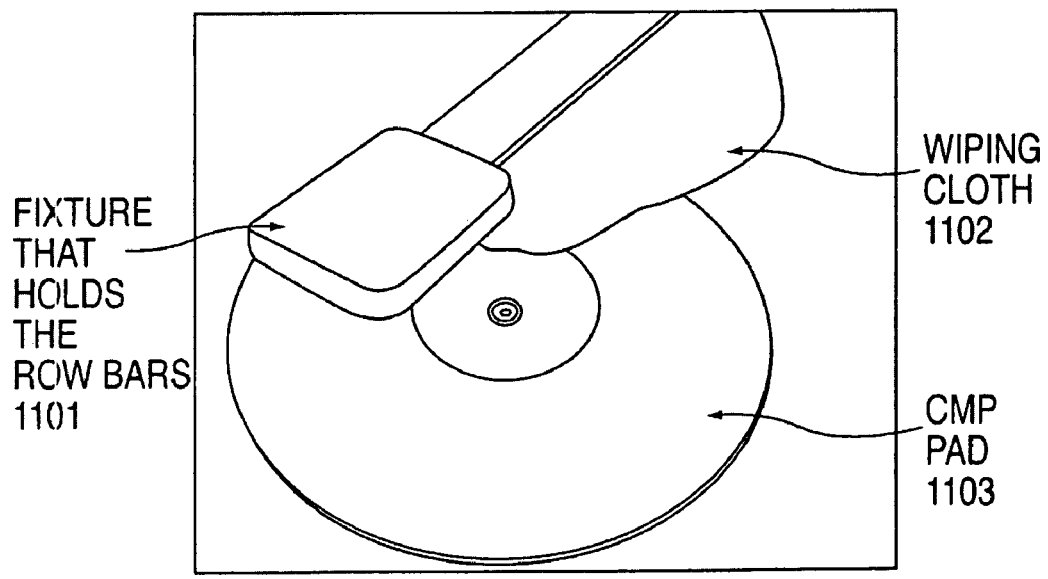
FIG. 11 provides an illustration of an embodiment of an open loop lapping apparatus.
Figure 6A:
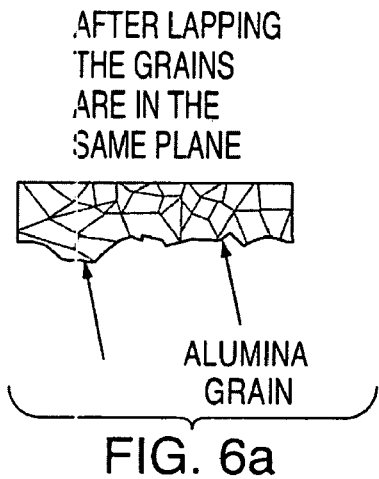
FIG. 6a-b provides an illustration of an etching process used to create a micro-texture.
Figure 6B:
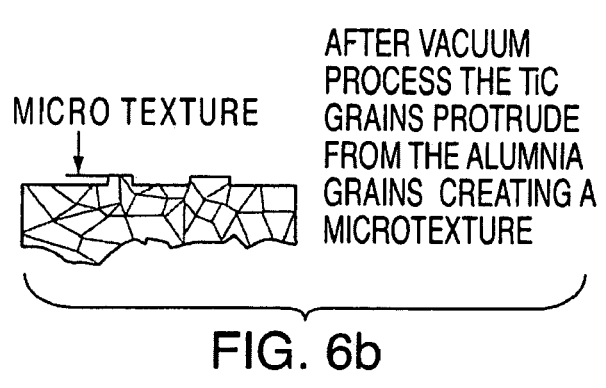
Figure 4A:
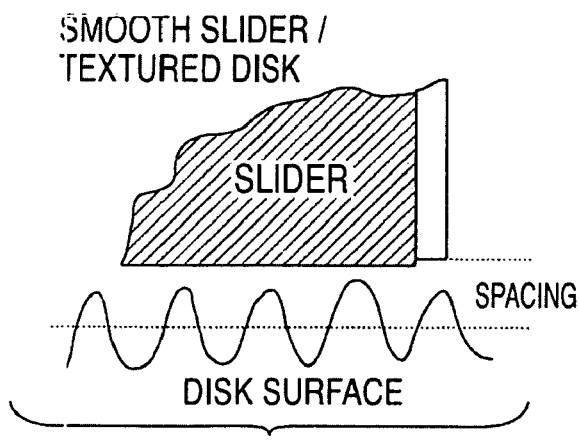
FIG. 4b provides an illustration of a smooth slider body surface and a textured disk surface.
Figure 4B:
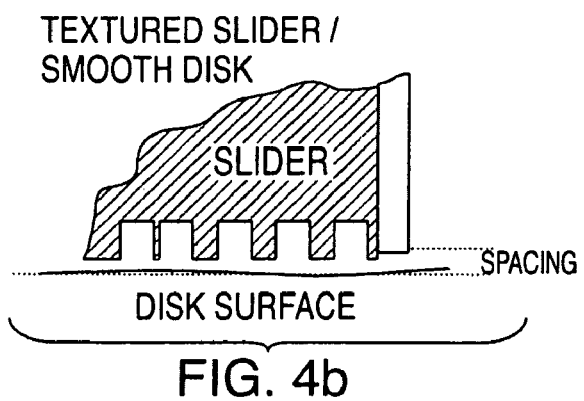
Figure 5A:
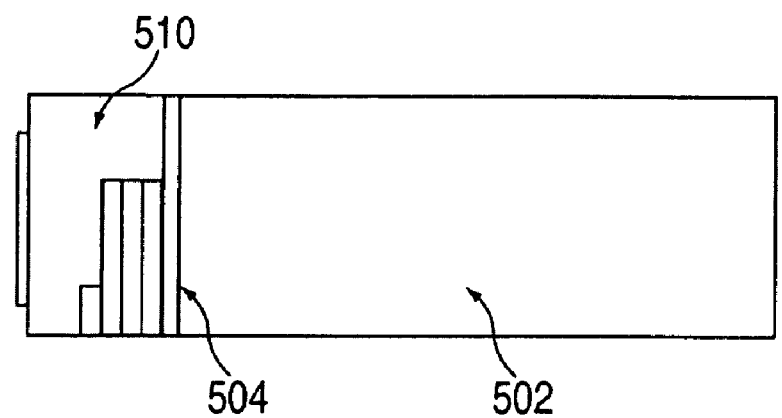
FIGS. 5a-b illustrate in a top and side view of an embodiment of a slider.
Figure 5B:
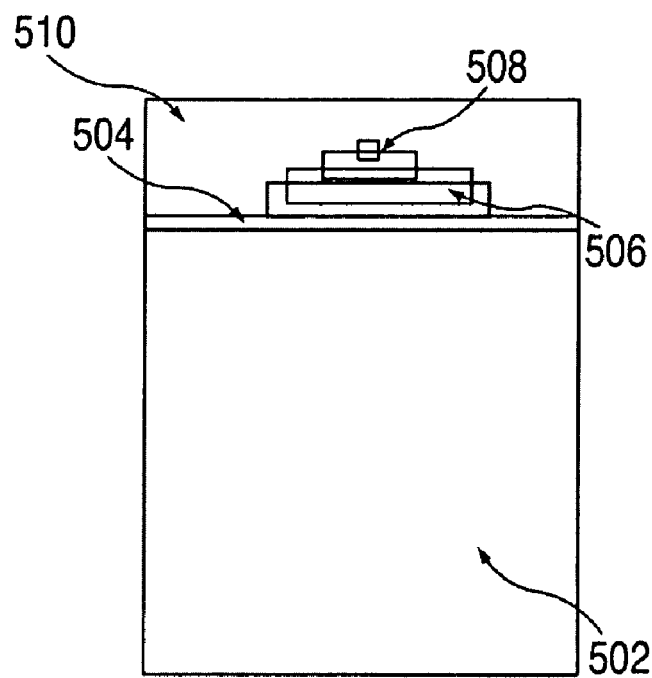
Figure 7:
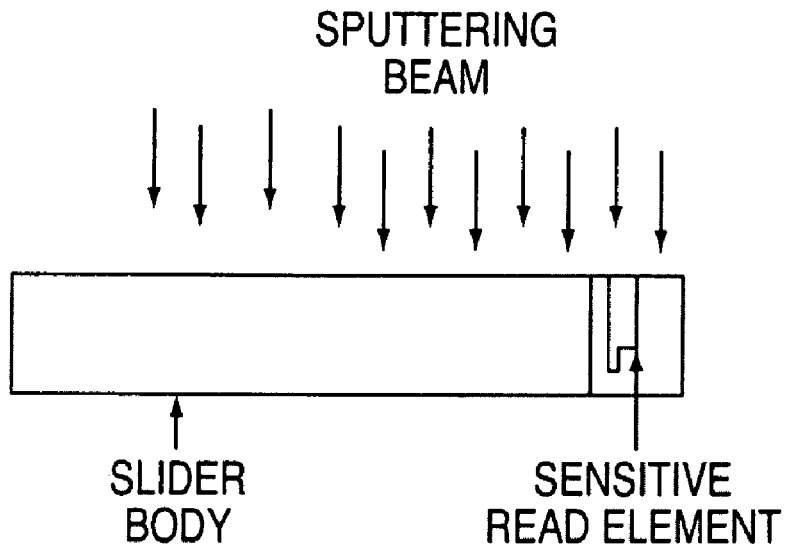
FIG. 7 provides an illustration of the exposure of a reading element to sputtering ion-energy beam.
Figure 8:
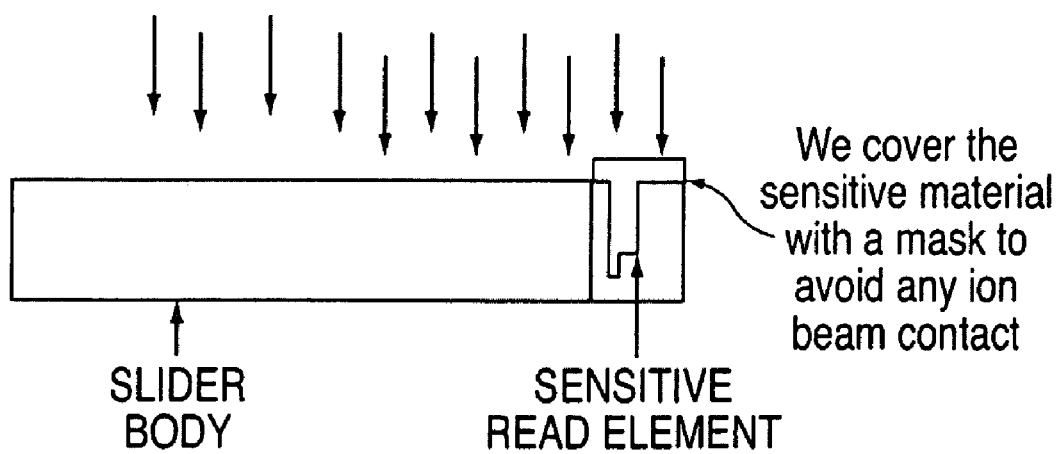
FIG. 8 provide an illustration of the use a photo-resist to cover a reading element during exposure to a sputtering ion-energy beam.

The lapping machine used for lapping the row bars on the CMP pad can either be a closed loop or open loop system. In the embodiment shown in FIG. 11, an open loop system is used, including fixture holding row bars 1101, a wiping cloth 1102 and a CMP pad 1103. During the lapping process, the CMP pad 1103 is rotated as the fixture bearing the row bars 1101 is kept in constant contact under a predetermined pressure (see description of FIG. 9). As described above, the wiping cloth 1102 is kept in contact with the rotating CMP pad surface to prevent any excess slurry buildup.

Figure 12:
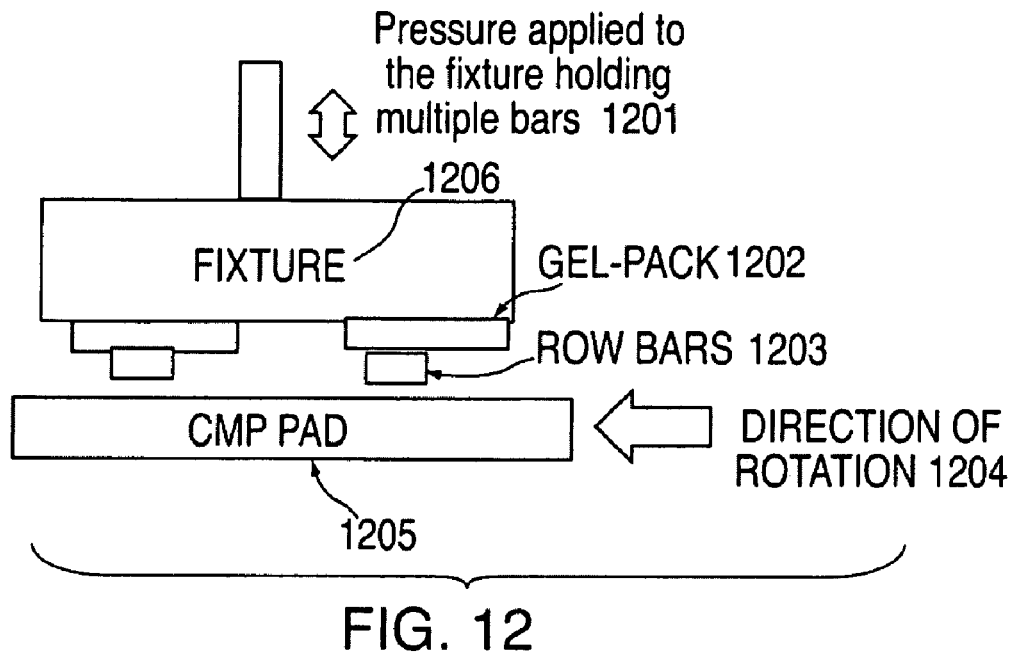
FIG. 12 provides an illustration of a lapping apparatus according to the embodiment of the present invention including a fixture embodiment and a CMP pad plate embodiment.

An embodiment of a lapping apparatus according to the present invention is shown in FIG. 12. In this embodiment, the face of the row bars 1203 to be textured is disposed facing the CMP pad 1203. The CMP pad 1203 may be in the form of a rotating plate. The row bars 1203 may be attached to gel packs 1202, which are further attached to the fixture 1206. As seen in FIG. 12, the row bars 1203 may be positioned with respect to the gel-pack 1202 such that when the CMP pad 1203 rotates, the rotational velocity of the pad 1204 enables the lapping and grinding of the row bars 1203. The fixture 1206 may then be secured to an oscillating holder (not shown), which may also enhance the lapping process. As discussed above, pressure 1201 may be applied to the fixture 1206 holding the multiple bars 1203 while the CMP pad is rotating to further enable the lapping and grinding processes. In embodiments of the present invention, the fixturing may be such to allow multiple row bars to be lapped at the same time, resulting in increased throughput for a manufacturing line.

Figure 13:
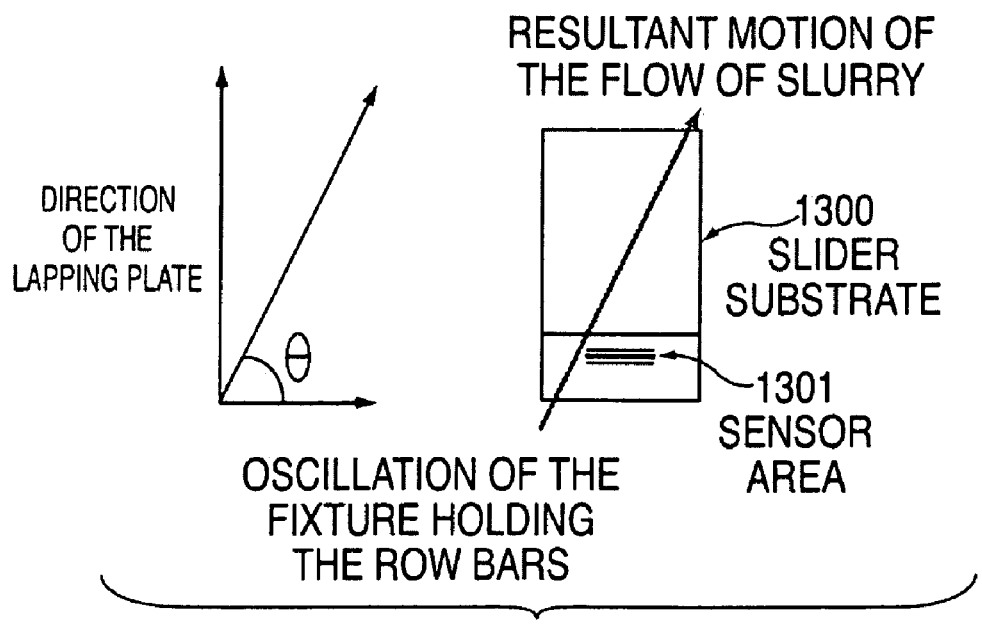
FIG. 13 provides an illustration of the tangential force of the slurry acting on a slider body.
Figure 14:
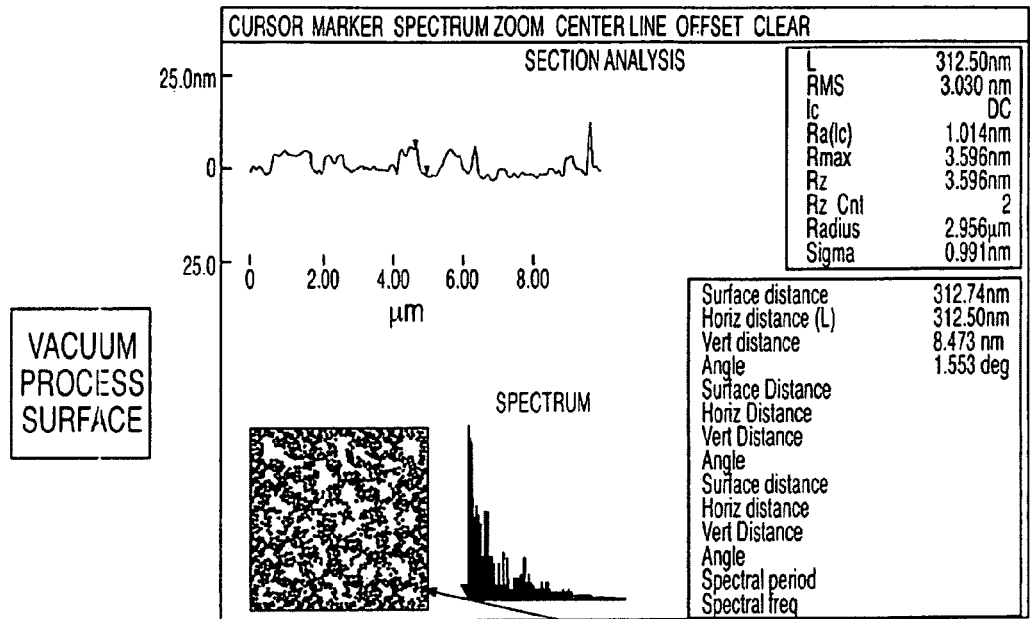
FIG. 14 provides an illustration of the textural characteristics of a slider after using a vacuum process for texturing.
Figure 15:
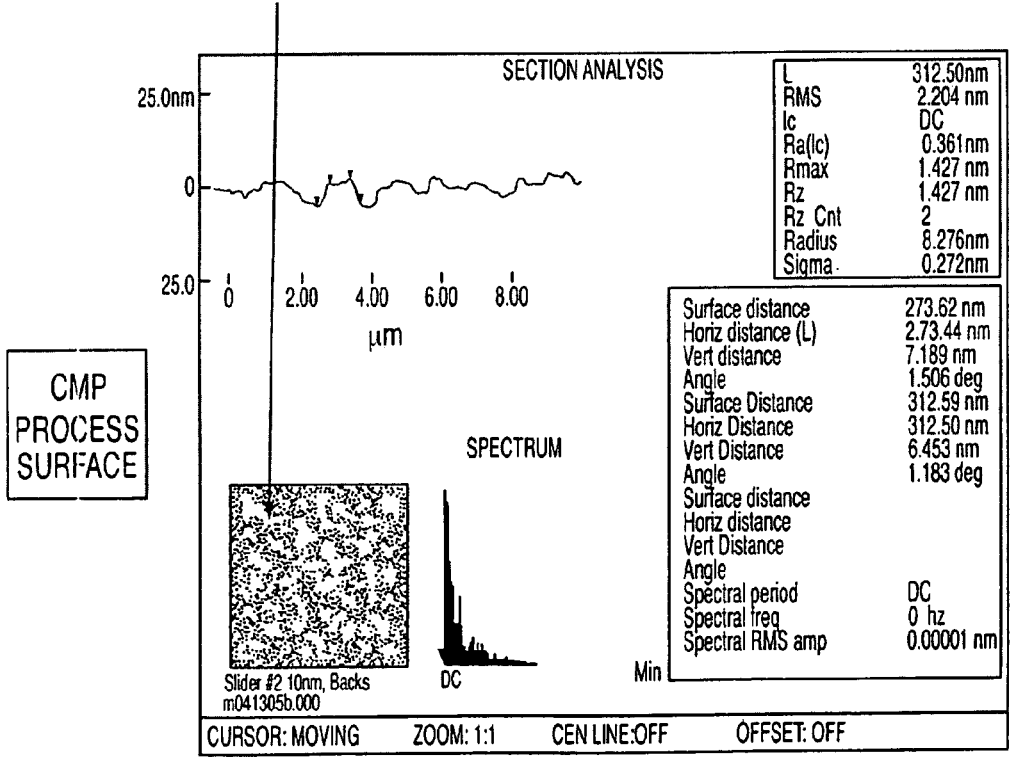
FIG. 15 provides an illustration of the textural characteristics of a slider after using a CMP process for texturing.
Figure 16:
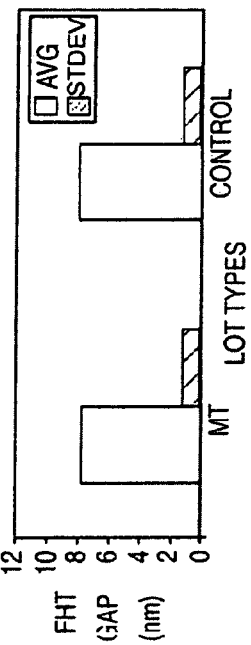
FIG. 16 provides tables illustrating HGA performance.

In embodiments of the present invention, the rotational velocity of the pad and the oscillation of the fixture may be chosen to create tangential forces in the direction of the plate's rotations. The direction of the resulting tangential forces (and the resultant motion of the flow of the slurry) with respect of the slider area 1300 and the sensor area 1301 is detailed in FIG. 13.

In one embodiment, the row bar may be lapped for 2 minutes during lapping. The row bars are then thoroughly wiped with Isopropyl alcohol (IPA) to avoid re-crystallization of the silica. They are then rinsed and washed in a soapy solution in an ultrasonic bath for 15 minutes. This cleaning process further ensures a particle free row bar of magnetic heads.

Therefore, in various embodiments of the texturing method as disclosed in the present invention, the lapping time, the pressure exerted during the lapping process, the strength of the slurry solution, the rotational velocity and the abrasiveness of the CMP pad are all adjusted to achieve the optimum amount of micro texture on the slider surface.

The micro texture produced with embodiment methods of the present invention may produce more desirable random removal of alumina grains. This random removal helps to create additional texture on the head of the slider, thereby allowing for better flying height characteristics.

During testing, the completed heads textured according to embodiments of the present invention were later built onto suspensions, installed into drives, and their performance evaluated. Both the altitude and rpm sensitive tests revealed an improved response when compared to the regular non-textured heads as shown in Table 1 below. These results indicated that of the irregular texturing spots of the CMP process proved effective. The flying height measurements were also measured and displayed normal flying height characteristics, as shown in Table 2, below.

The cost involved in embodiments of the present invention may be very minimal since the colloidal silica and the CMP pads described in embodiments of the present invention are both cheap and readily available to those in the semiconductor industry. Unlike the diamond-based slurries, the cost of the colloidal silica is much lower. Unlike in vacuum processes discussed above, the sensors parts are not subjected to high energy beams thus resulting in poor magnetic performances for prolonged time.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of principles and variables. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

What is claimed is:

1. A method, comprising:
    formulating an abrasive slurry solution of predetermined desired acidity;
    treating a chemical mechanical polishing pad with the abrasive slurry;
    rotating the chemical mechanical polishing pad;
    disposing at least one slider body on the chemical mechanical polishing pad, wherein said disposing at least one slider includes grouping the at least one slider body in at least one row bar attached to a fixture;
    lapping and grinding the at least one slider body for a predetermined period of time, and oscillating the fixture to enhance the lapping and the grinding; wherein a rotational velocity of the chemical mechanical polishing pad and the oscillation of the fixture is chosen to result in tangential forces parallel to the direction of the chemical mechanical polishing pad's rotation.

2. The method of claim 1, wherein the abrasive slurry solution is comprised of colloidal silica.

3. The method of claim 1, wherein the predetermined acidity of the abrasive slurry solution has a pH level of approximately 8.

4. The method of claim 1, wherein the abrasive slurry solution is comprised of particulates approximately 30 nm in diameter.

5. The method of claim 2, wherein the abrasive slurry solution is dispersed in deionized water by a 5% weight ratio.

6. The method of claim 1, wherein the chemical mechanical polishing pad further comprises fibers, also treated with the abrasive slurry solution, emanating from a base of the chemical mechanical polishing pad.

7. The method of claim 6, wherein the fibers are approximately 600 microns in length.

8. The method of claim 6, wherein during the lapping and grinding operation fibers capture abrasive alumina particles dispersed over the head.

9. The method of claim 1, wherein the chemical mechanical polishing pad further comprises holes to prevent excessive buildup of the abrasive slurry solution.

10. The method of claim 1, wherein the chemical mechanical polishing pad rotates to enhance the lapping and the grinding.

11. The method of claim 1, wherein pressure applied to the fixture enhances the lapping and the grinding.

12. The method of claim 1, wherein the predetermined period of time is two minutes.

13. An apparatus, comprising:
    an abrasive slurry solution of predetermined acidity;
    a rotating chemical mechanical polishing pad treated with the abrasive slurry solution; and
    at least one slider body grouped in at least one row bar attached to an oscillation fixture that is disposed on the rotating chemical mechanical polishing pad for lapping and grinding over a predetermined period of time, and wherein the oscillation fixture oscillates to enhance the lapping and the grinding and wherein a rotational velocity of the rotating chemical mechanical polishing pad and an oscillation of the oscillation fixture is controlled to result in tangential forces parallel to the direction of the rotating chemical mechanical polishing pad's rotation.

14. The apparatus of claim 13, wherein the abrasive slurry solution is comprised of colloidal silica.

15. The apparatus of claim 14, wherein the abrasive slurry solution is comprised of densely packed particulates approximately 30 nm in diameter.

16. The apparatus of claim 13, wherein the acidity of the abrasive slurry solution is approximately 8.

17. The apparatus of claim 13, wherein the chemical mechanical polishing pad further comprises fibers, also treated with the abrasive slurry solution, emanating from a base of the chemical mechanical polishing pad.

18. The apparatus of claim 17, wherein the fibers are approximately 600 microns in length.

19. The apparatus of claim 13, wherein the chemical mechanical polishing pad further comprises holes to prevent excessive buildup of the abrasive slurry solution during the lapping and the grinding process.

20. The apparatus of claim 13, wherein the chemical mechanical polishing pad rotates during the lapping and the grinding process.

21. The apparatus of claim 13, wherein pressure is applied to the fixture to enhance the lapping process and the grinding process.

22. The apparatus of claim 13, wherein the predetermined period of time is two minutes.

23. The apparatus of claim 13, wherein an open loop system is employed.

24. The apparatus of claim 13, wherein an closed loop system is employed.

* * * * *